United States Patent
Ando et al.

(10) Patent No.: US 10,503,305 B2
(45) Date of Patent: Dec. 10, 2019

(54) DISPLAY PANEL WITH PRESSURE SENSOR AND ELECTRONIC DEVICE WITH PRESSING INPUT FUNCTION

(71) Applicants: Murata Manufacturing Co., Ltd., Nagaokakyo-shi, Kyoto-fu (JP); Mitsui Chemicals, Inc., Tokyo (JP)

(72) Inventors: Masamichi Ando, Nagaokakyo (JP); Kazuhiro Tanimoto, Sodegaura (JP); Mitsunobu Yoshida, Sodegaura (JP); Shigeo Nishikawa, Sodegaura (JP)

(73) Assignees: MURATA MANUFACTURING CO., LTD., Nagaokakyo-Shi, Kyoto-Fu (JP); MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/931,947

(22) Filed: Nov. 4, 2015

(65) Prior Publication Data
US 2016/0077649 A1    Mar. 17, 2016

Related U.S. Application Data

(63) Continuation of application No. PCT/JP2014/062773, filed on May 14, 2014.

(30) Foreign Application Priority Data

May 27, 2013   (JP) .................. 2013-110646

(51) Int. Cl.
*G06F 3/041*   (2006.01)
*G02F 1/1335*   (2006.01)

(52) U.S. Cl.
CPC ...... *G06F 3/0414* (2013.01); *G02F 1/133528* (2013.01); *G06F 2203/04103* (2013.01)

(58) Field of Classification Search
CPC ......... G06F 3/0414; G06F 2203/04103; G02F 1/133528; G02F 2001/133531; G02B 5/30; G09F 9/00
See application file for complete search history.

(56) References Cited

U.S. PATENT DOCUMENTS

| | | | |
|---|---|---|---|
| 2004/0075779 A1* | 4/2004 | Paukshto | G02F 1/13338 349/12 |
| 2007/0002217 A1* | 1/2007 | Chang | G02F 1/133528 349/98 |

(Continued)

FOREIGN PATENT DOCUMENTS

| | | |
|---|---|---|
| JP | 2012-230491 A | 11/2012 |
| JP | 2012-230657 A | 11/2012 |

(Continued)

OTHER PUBLICATIONS

JPWO2014192541A1 correseponding to Machine translation of priority document JP 2013-110646 (Year: 2013).*

(Continued)

*Primary Examiner* — Patrick N Edouard
*Assistant Examiner* — Joseph P Fox
(74) *Attorney, Agent, or Firm* — Arent Fox LLP

(57) ABSTRACT

An electronic device with pressing input function has a substantially rectangular parallelepiped-shaped housing. A display panel with pressure sensor and an arithmetic circuit module are disposed in the housing. The display panel with pressure sensor is composed of a pressure sensor and a display panel. In the display panel, a front polarizing plate is disposed on a front face of a liquid crystal panel. In the pressure sensor, electrodes are formed on both respective flat plate faces of a piezoelectric film having birefringence. The pressure sensor is disposed between the liquid crystal panel and the front polarizing plate of the display panel, and a (Continued)

uniaxial drawing direction of the piezoelectric film is parallel to a polarizing direction of the front polarizing plate.

18 Claims, 11 Drawing Sheets

(56) References Cited

U.S. PATENT DOCUMENTS

| | | | | |
|---|---|---|---|---|
| 2009/0046072 A1* | 2/2009 | Emig | .................. | G06F 3/044 |
| | | | | 345/173 |
| 2010/0289771 A1* | 11/2010 | Nozawa | .................. | G06F 3/045 |
| | | | | 345/174 |
| 2011/0109204 A1* | 5/2011 | Tajitsu | .................. | H01L 41/193 |
| | | | | 310/348 |
| 2012/0025674 A1* | 2/2012 | Yoshida | .................. | C08G 63/08 |
| | | | | 310/365 |
| 2012/0038583 A1* | 2/2012 | Westhues | .............. | G06F 3/0412 |
| | | | | 345/174 |
| 2013/0229465 A1* | 9/2013 | Fujii | .................. | B41J 2/14233 |
| | | | | 347/72 |
| 2013/0234988 A1* | 9/2013 | Ando | .................. | G06F 3/0414 |
| | | | | 345/174 |
| 2014/0049137 A1 | 2/2014 | Ando et al. | | |
| 2014/0085254 A1* | 3/2014 | Tenuta | .................. | G06F 3/0414 |
| | | | | 345/174 |

FOREIGN PATENT DOCUMENTS

| | | |
|---|---|---|
| WO | WO 2011/125408 A1 | 10/2011 |
| WO | WO 2012137897 A1 | 10/2012 |

OTHER PUBLICATIONS

International Search Report issued for PCT/JP2014/062773, dated Aug. 5, 2014.
Written Opinion of the International Searching Authority issued for PCT/JP2014/062773, dated Aug. 5, 2014.

* cited by examiner

DISPLAY PANEL WITH PRESSURE SENSOR AND ELECTRONIC DEVICE WITH PRESSING INPUT FUNCTION

CROSS REFERENCE TO RELATED APPLICATIONS

The present application is a continuation of International application No. PCT/JP2014/062773, filed May 14, 2014, which claims priority to Japanese Patent Application No. 2013-110646, filed May 27, 2013, the entire contents of each of which are incorporated herein by reference.

FIELD OF THE INVENTION

The present invention relates to a display panel with pressure sensor capable of detecting pressing a display screen with a finger of the like, and an electronic device with pressing input function provided with the display panel with pressure sensor.

BACKGROUND OF THE INVENTION

Various electronic devices provided with a thin display panel such as a liquid crystal display capable of receiving an operational input on its display surface have been proposed. For example, Patent Literature 1 discloses a touch sensor for detecting an operational position, which is disposed on a front face of a display panel. When an operator touches an operation surface, the touch sensor detects a touch position, and the electronic device executes processing according to the detected operational position.

In the case where such conventional electronic device with touch sensor includes a display panel requiring a polarizing plate such as a liquid crystal panel, components constituting the electronic device are disposed as follows.

A front polarizing plate is disposed on the operation surface (outermost face). A touch panel is disposed on the opposite side of the front polarizing plate to the operation surface. A liquid crystal panel formed of a pair of glasses that sandwiches liquid crystal therebetween is disposed on the opposite side of the touch panel to the front polarizing plate. A rear polarizing plate is disposed on the opposite side of the liquid crystal panel to the touch panel. That is, the touch panel is disposed between the front polarizing plate and the rear polarizing plate.

With the above-mentioned structure, in the case of a transmission liquid crystal display, light from a backlight disposed on the rear face of the rear polarizing plate penetrates the rear polarizing plate, the liquid crystal panel, the touch panel, and the front polarizing plate in this order and then, is emitted to the operation surface. In the case of a reflection liquid crystal display, for example, a reflective plate is provided in place of the rear polarizing plate, and light incident from the operation surface penetrates the front polarizing plate, the touch panel, the liquid crystal panel, the reflective plate, the liquid crystal panel, the touch panel, and the front polarizing plate in this order and then, returns to the operation surface.

The front polarizing plate and the rear polarizing plate have the property of transmitting only a wave (light wave) vibrating in a certain direction. The direction in which the wave is transmitted is a polarizing direction. Accordingly, the polarizing direction of the front polarizing plate, the polarizing direction of the rear polarizing plate, and optical characteristics of the liquid crystal panel are combined to set contrast and transmittance of the liquid crystal display and improve appearance of the display screen.

Patent Literature 1—Japanese Patent Unexamined Publication No. 2012-230657 bulletin

SUMMARY OF THE INVENTION

However, the above-mentioned conventional electronic device with the thin display panel has a following problem.

Currently, a pressure sensor is composed of a piezoelectric element formed of a chiral polymer to detect pressing onto the operation surface. However, the piezoelectric element formed of the chiral polymer has birefringence. For example, the refractive index of a wave vibrating in a direction parallel to the drawing direction of a uniaxially drawn L-type polylactic acid (PLLA) is 1.47. The refractive index of a wave vibrating in a direction vertical to the drawing direction of the uniaxially drawn L-type polylactic acid (PLLA) is 1.45. This is the retardation property.

When incorporating such a pressure sensor into the above-mentioned thin display panel, when the transmission display panel is disposed between the front polarizing plate and the rear polarizing plate, and the reflective display panel is disposed between two front polarizing plates along the light guiding direction, a light wave disperses in two directions due to birefringence of the pressure sensor, and the light wave components dispersing in the two directions are incident on the front polarizing plate. Then, unlike the configuration without the pressure sensor, the two components penetrate the front polarizing plate and then, interfere with each other to change the color of the emitted light. This leads to the problem that desired image color cannot be acquired. Although this problem is avoided by mounting the pressure sensor on the front polarizing plate, when a user wearing polarizing sunglasses views the screen, crossed nicols are caused by the front polarizing plate of the thin display panel and polarization of the sunglasses, thereby disadvantageously changing the color of the screen.

Therefore, an object of the present invention is to provide a display panel with pressure sensor capable of reproducing desired color even in the presence of a pressure sensor using a piezoelectric element formed of a chiral polymer.

A display panel according to the present invention includes an image forming panel for controlling light emitted to a front face side to form a displayed image, a front polarizing plate disposed on the front face side of the image forming panel, and a pressure sensor having a piezoelectric film formed of a chiral polymer. In the display panel, the pressure sensor is disposed relative to the image forming panel such that a uniaxial drawing direction of the piezoelectric film is parallel to or orthogonal to a polarizing direction of the front polarizing plate.

With this configuration, since only one of two components of a light wave dispersing on the piezoelectric film penetrates the front polarizing plate, the color of the light wave does not change even after the light penetrates the front polarizing plate.

Preferably, the display panel with pressure sensor according to the present invention has either of following configurations. The pressure sensor is disposed opposite to the image forming panel across the front polarizing plate. The pressure sensor is disposed between the front polarizing plate and the image forming panel.

According to the present invention, since the pressure sensor is disposed near the operation surface, the pressure detection sensitivity can be increased. Further, the front polarizing plate can be used as a protective layer for the pressure sensor.

Preferably, the display panel with pressure sensor of the present invention has a following configuration. The chiral polymer forming the piezoelectric film is polylactic acid. The polylactic acid is at least uniaxially drawn, and the drawing direction is parallel to or orthogonal to a polarizing direction of the front polarizing plate.

With this configuration, polylactic acid is used for the piezoelectric film. For the polylactic acid, a refractive index in the uniaxial drawing direction as the main drawing direction is different from a refractive index in the direction orthogonal to the uniaxial drawing direction. Accordingly, discoloration of display can be prevented by making the uniaxial drawing direction parallel to or orthogonal to the polarizing direction. Further, use of the uniaxially drawn polylactic acid can provide a pressure sensor having a high detection sensitivity of the pressing amount (pressing amount of the operation surface) and an excellent temperature characteristic.

According to the present invention, a buffer member is preferably provided between the pressure sensor and the image forming panel. This configuration can suppress the image forming panel from obstructing displacement of the piezoelectric film due to pressing. This can improve the detection sensitivity of the pressure sensor.

In the display panel with pressure sensor of the present invention, the pressure sensor may have a position-detecting sensor function of detecting a touch position. This configuration enables detection of the pressing amount as well as the touch position.

An electronic device with pressing input function of the present invention includes the display panel with pressure sensor according to any one of the display panels, and arithmetic unit that detects a pressing amount based on a detection signal of the pressure sensor, and a housing that is opened to a display surface and accommodates the display panel with pressure sensor and the arithmetic unit.

With this configuration, even the electronic device provided with the pressure sensor using the piezoelectric film having birefringence enables the operator to view light emitted from the display panel and the front polarizing plate, without changing the color of the light.

According to the present invention, even the display panel including the pressure sensor having birefringence can reproduce a desired color.

DETAILED DESCRIPTION OF THE PREFERRED EMBODIMENTS

Figure 1:
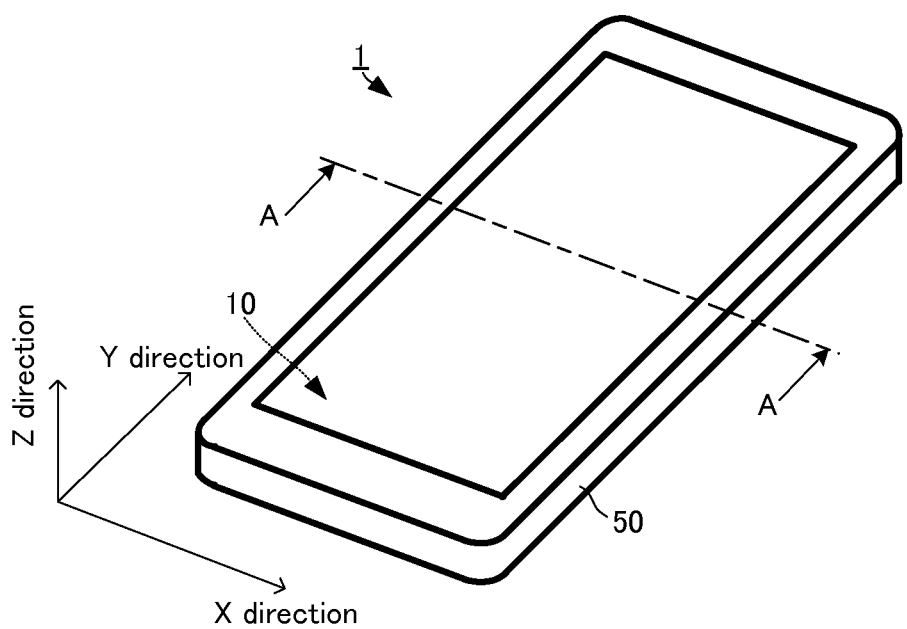
FIG. 1 is an external perspective view of an electronic device with pressing input function in accordance with a first embodiment of the present invention.
Figure 2:
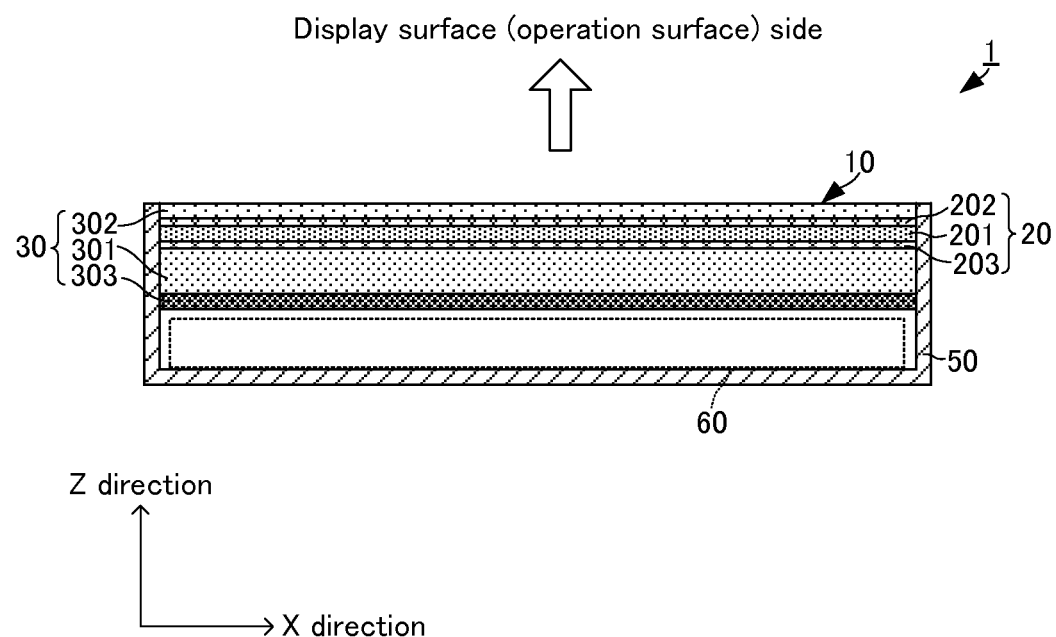
FIG. 2 is a sectional view of an electronic device with pressing input function in accordance with the first embodiment of the present invention.
Figure 3A:
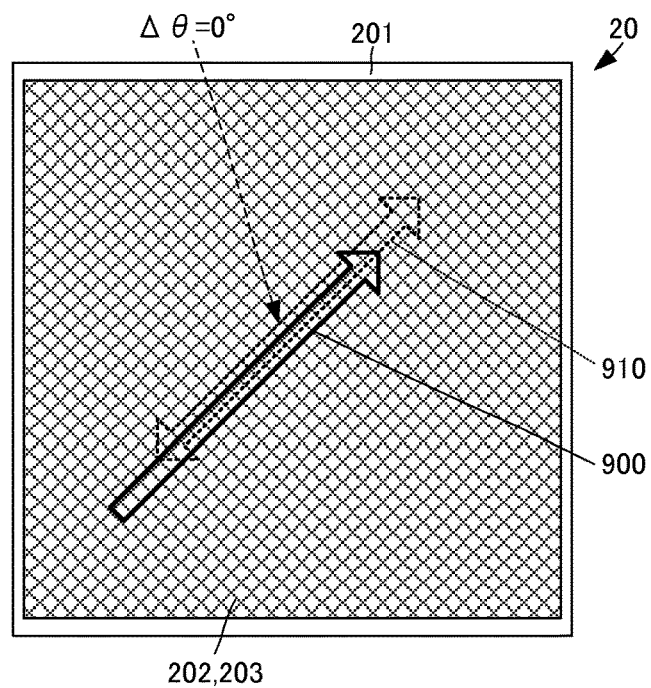
FIGS. 3A and 3B are plan views of a display panel with pressure sensor in accordance with the first embodiment of the present invention.
Figure 3B:
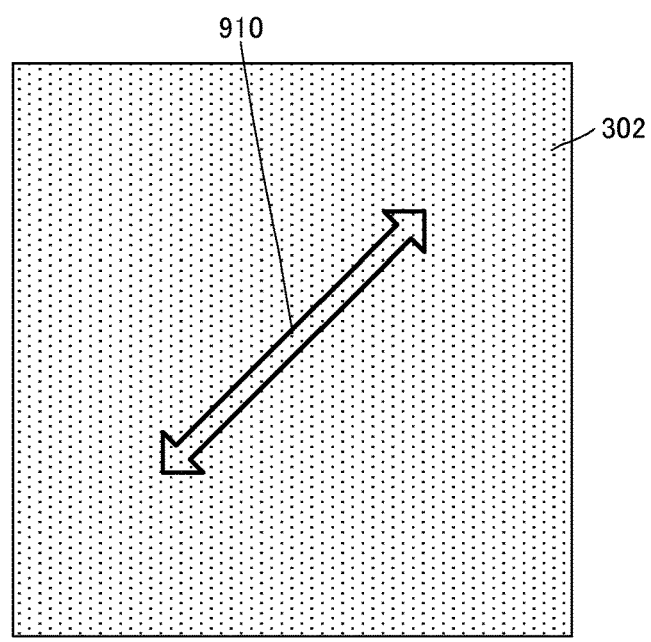
Figure 3B:
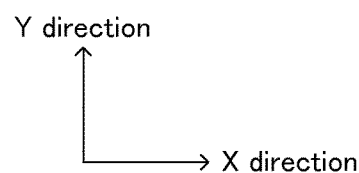

An electronic device with pressing input function and a display panel with a pressure sensor provided in the electronic device in accordance with a first embodiment of the present invention will be described below with reference to the drawings. FIG. 1 is an external perspective view of an electronic device with pressing input function in accordance with the first embodiment of the present invention. FIG. 2 is a sectional view illustrating the electronic device with pressing input function in accordance with the first embodiment of the present invention. FIGS. 3A and 3B are plan views of the display panel with pressure sensor in accordance with the first embodiment of the present invention. FIG. 3A is a plan view of the pressure sensor, and FIG. 3B is a plan view of a front polarizing plate.

As illustrated in FIG. 1, an electronic device with pressing input function 1 includes a substantially rectangular parallelepiped-shaped housing 50. A front face side of the housing 50 is opened. Hereinafter, a widthwise direction (horizontal direction) of the housing 50 is defined as an X direction, a lengthwise direction (vertical direction) as a Y direction, a thickness direction as a Z direction. In this embodiment, a length of the housing 50 in the X direction is smaller than a length of the housing 50 in the Y direction. However, the length in the X direction may be the same as the length in the Y direction, or the length in the X direction may be larger than the length in the Y direction.

As illustrated in FIG. 2, a display panel with pressure sensor 10 and an arithmetic circuit module 60 are disposed in the housing 50. The display panel with pressure sensor 10 and the arithmetic circuit module 60 are disposed in this order in the Z direction from an opened surface (display surface) side of the housing 50. The display panel with pressure sensor 10 includes a pressure sensor 20 and a display panel 30.

The display panel 30 includes a flat plate-like liquid crystal panel 301, a front polarizing plate 302, and a rear reflective plate 303. A driving current is applied from the outside to the liquid crystal panel 301, changing the alignment of liquid crystal so as to form a predetermined image pattern. The front polarizing plate 302 allows only a light wave vibrating in one direction to transmit therethrough. The direction in which the light transmits is a polarizing direction. For example, as illustrated in FIGS. 3A and 3B, on the display panel 30 in this embodiment, the polarizing direction 910 of the front polarizing plate 302 forms a 45 degree angle relative to the X direction and the Y direction. The rear reflective plate 303 reflects light from the liquid crystal panel 301 toward the liquid crystal panel 301.

The pressure sensor 20 is disposed between the liquid crystal panel 301 and the front polarizing plate 302 of the display panel 30. As illustrated in FIG. 3A, the pressure sensor 20 includes a flat film-like piezoelectric film 201. The electrodes 202, 203 are disposed on both flat plate faces (principal faces) of the piezoelectric film 201. The electrodes 202, 203 are formed on the substantially entire flat plate faces of the piezoelectric film 201.

The piezoelectric film 201 is a film formed of a chiral polymer. In this embodiment, polylactic acid (PLA), in particular, L-type polylactic acid (PLLA) is used as the chiral polymer. The PLLA is uniaxially drawn.

The PLLA formed of the chiral polymer has a spiral principal chain. When the PLLA is uniaxially drawn, its molecules are oriented, providing a piezoelectric property. By pressing the flat plate faces of the piezoelectric film, the uniaxially drawn PLLA generates electric charge. The amount of electric charge generated during pressing depends on the displacement of the flat plate faces in the direction orthogonal to the flat plate faces according to the pressing amount.

The piezoelectric constant of the uniaxially drawn PLLA is extremely high in polymers. Consequently, the displacement caused by pressing can be detected at a high sensitivity.

The draw ratio is preferably, about 3 to 8 times. Thermal treatment after drawing promotes crystallization of the drawn chain of the polylactic acid to improve the piezoelectric constant. It is noted that biaxial drawing can achieve the same effect as that of uniaxial drawing by making the draw ratio of the axes different. For example, in the case of biaxially drawing the film 8 times in a first axial direction and twice in a second axial direction orthogonal to the first axial direction, the substantially same piezoelectric constant can be acquired as in the case of uniaxially drawing 4 times in the first axial direction. That is, the above-mentioned uniaxial drawing direction means the most drawn direction, also including the case where the piezoelectric film is drawn in multiple directions. Because the uniaxially drawn film tends to tear in the drawing axis direction, the biaxial drawing can somewhat increase the strength of the film.

Because the PLLA exhibits the piezoelectric property by molecule orientation processing such as drawing, unlike other polymers such as PVDF and piezoelectric ceramics, polling is not required. That is, the piezoelectric property of the PLLA as a non-ferroelectric substance is not produced by ion polarization as in ferroelectric substances such as PVDF and PZT, and is derived from its characteristic spiral structure of molecules. For this reason, the PLLA does not provide pyroelectricity generated in other ferroelectric piezoelectric substances. Further, the piezoelectric constant of the PVDF varies with time, and may be greatly decreased in some cases, while the piezoelectric constant of the PLLA does not change with time. Consequently, the displacement caused by pressing can be detected at a high sensitivity irrespective of surrounding environment.

Further, the PLLA has a very low relative permittivity of about 2.5 and thus, given that d is piezoelectric constant and $\varepsilon^T$ is dielectric constant, a piezoelectric output constant (=piezoelectric g constant, $g=d/\varepsilon^T$) becomes large. The piezoelectric g constant of the PVDF having a dielectric constant $\varepsilon_{33}^T=13\times\varepsilon_0$ and a piezoelectric constant $d_{31}=25$ pC/N becomes $g_{31}=0.2172$ Vm/N according to the above-mentioned equation. When converting the piezoelectric g constant of the PLLA having a piezoelectric constant $d_{14}=10$ pC/N into $g_{31}$, due to $d_{14}=2\times d_{31}$, $d_{31}=5$ pC/N, and the piezoelectric g constant becomes $g_{31}=0.2258$ Vm/N. Therefore, the PLLA having the piezoelectric constant $d_{14}=10$ pC/N can achieve the same detection sensitivity of the pressing amount as that of the PVDF. The inventors of this application experimentally obtained PLLA having $d_{14}=15$ to 20 pC/N. Using the PLLA can detect pressing at a much higher sensitivity.

The electrodes 202, 203 are suitably, inorganic electrodes such as ITO, ZnO, Ag nanowire, carbon nanotube, and graphene, or organic electrodes containing polythiophene, polyaniline, or the like as a main component. Use of these materials can achieve a highly translucent conductive pattern. By providing the electrodes 202, 203, the electric charge generated on the piezoelectric film 201 can be acquired as a potential difference, and a piezoelectric detection signal having a voltage value corresponding to the pressing amount can be outputted to the outside. The piezoelectric detection signal is outputted to the arithmetic circuit module 60 via wiring not shown. The arithmetic circuit module calculates the pressing amount based on the piezoelectric detection signal.

Such PLLA has birefringence. Specifically, the refractive index of the PLLA in the drawing direction is about 1.47, while the refractive index in the direction orthogonal to the drawing direction is about 1.45. Accordingly, light penetrating the piezoelectric film 201, that is, the pressure sensor 20 generates retardation between the component in the drawing direction and the component (orthogonal component) in the direction orthogonal to the drawing direction.

The pressure sensor 20 thus configured is a rectangle extending in the X direction and the Y direction that are orthogonal to each other. A uniaxial drawing direction 900 of the piezoelectric film 201 of the pressure sensor 20 forms a 45 degree angle relative to the X direction and the Y direction.

Accordingly, as illustrated in FIG. 3A, when the display panel with pressure sensor 10 is viewed from the display surface, a polarizing direction 910 of the front polarizing plate 302 is parallel to the uniaxial drawing direction 900 of the piezoelectric film 201. In other words, an angular difference AO between the uniaxial drawing direction 900 of the piezoelectric film 201 and the polarizing direction of the front polarizing plate 302 is 0 degree (180 degrees).

The display panel with pressure sensor 10 thus configured and an electronic device with pressing input function 1 enable the operator to view the display screen according to a following principle. Light emitted from the display surface (operation surface) of the housing 50 is incident onto the pressure sensor 20 through the front polarizing plate 302. The light penetrating the pressure sensor 20 is incident onto the liquid crystal panel 301. The light incident onto the liquid crystal panel 301 reflects on the rear reflective plate 303, penetrates the liquid crystal panel 301 again, and then, returns to the front face side. In combination with the front polarizing plate 302, this light forms a displayed image having predetermined color and pattern (displayed image-forming light). The displayed image-forming light penetrates the pressure sensor 20, and is emitted to the front polarizing plate 302.

Since the polarizing direction 910 of the front polarizing plate 302 is parallel to the uniaxial drawing direction 900 of the piezoelectric film 201, only the light component in the polarizing direction 910 of the front polarizing plate 302, that is, in the uniaxial drawing direction 900 of the piezoelectric film 201 penetrates the front polarizing plate 302. Consequently, light emitted to the operation surface through the front polarizing plate 302 is not affected by retardation of the piezoelectric film 201.

Therefore, even when the pressure sensor 20 is provided, the operator can view desired color to be reproduced on the display panel 30 without discoloration.

Figure 4A:
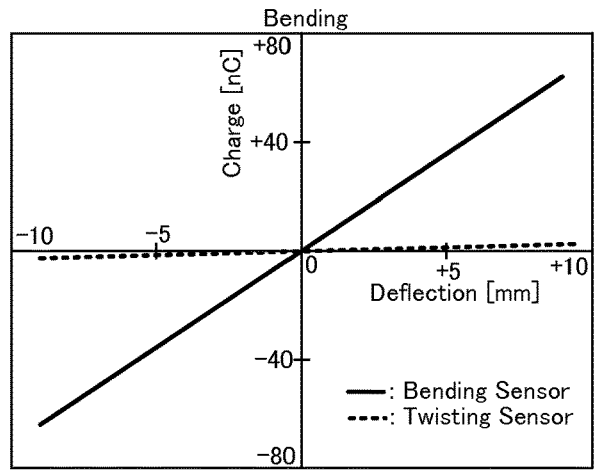
FIGS. 4A to 4C are views illustrating detection characteristics of PLLA used for the pressure sensor.
Figure 4B:
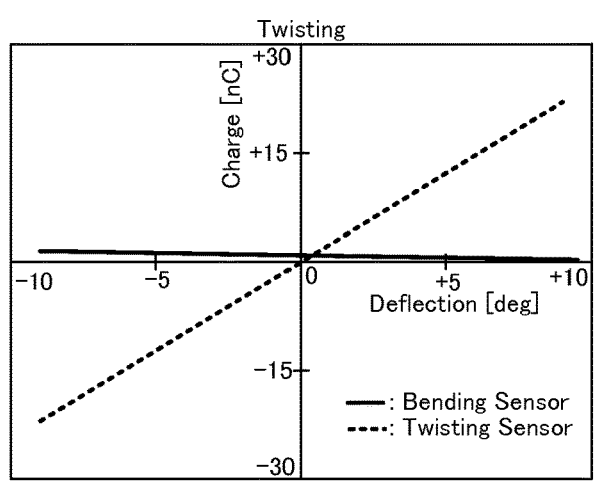
Figure 4C:
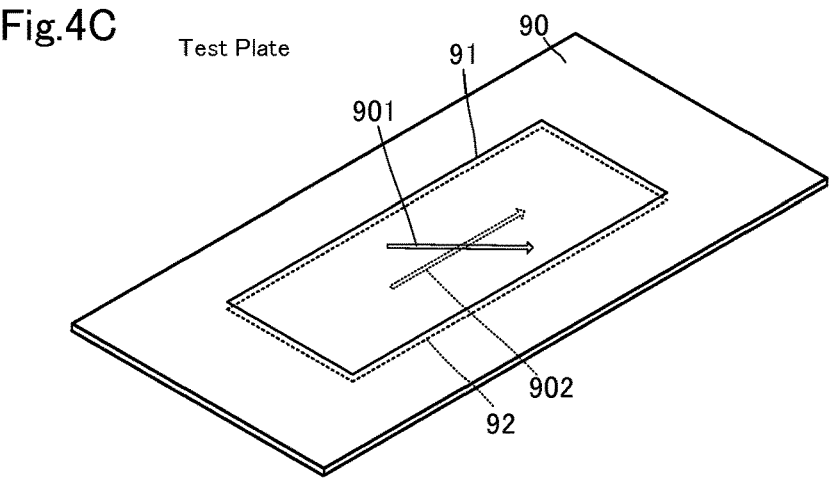

Moreover, the configuration in this embodiment can further increase the detection sensitivity of the pressing amount. FIGS. 4A and 4B are views illustrating detection characteristics of PLLA used for the pressure sensor. FIG. 4A illustrates a bending detection characteristic, and FIG. 4B illustrates a twisting detection characteristic. FIG. 4C is an external perspective view of a test plate with which the characteristics in FIGS. 4A and 4B are measured.

As illustrated in FIG. 4C, the test plate includes a rectangular flat plate-like base board 90, and rectangular piezoelectric films 91, 92 with electrodes in plan view. The base board 90 is formed of an acrylic plate (PMMA) having a length of 150 mm, a width of 70 mm, and a thickness of 2 mm. The piezoelectric films 91, 92 each are L-type polylactic acid PLLA having a length of 80 mm, a width of 30 mm, and a thickness of 0.07 mm. A piezoelectric stress constant $d_{14}$ of the piezoelectric films 91, 92 is 6.7 pC/N, and a tensile elastic constant in the uniaxial drawing direction is 5.9 GPa, and a tensile elastic constant in the direction orthogonal to the uniaxial drawing direction is 3.3 GPa.

The piezoelectric films 91, 92 are disposed at the substantially center of the base board 90 in a plan view such that their longitudinal directions are aligned. The piezoelectric film 91 is disposed on one flat plate face of the base board 90, and the piezoelectric film 92 is disposed on the other flat plate face of the base board 90.

An uniaxial drawing direction 901 of the piezoelectric film 91 forms 45 degrees relative to the longitudinal direction and the widthwise direction. A uniaxial drawing direction 902 of the piezoelectric film 92 is parallel to the longitudinal direction.

In measuring the bending detection characteristic, both longitudinal ends of the base board 90 are fixed, and a pressing force is applied to the center of the flat plate faces of the base board 90. In measuring the twisting detection characteristic, one longitudinal end of the base board 90 is fixed, and the other longitudinal end is rotated (twisted). A horizontal axis of FIG. 4A illustrates a displacement at the center, and a horizontal axis in FIG. 4B illustrates a rotational angle of the free end (the other twisted end) with respect to the fixed end (one fixed end). FIG. 4A and FIG. 4B illustrate the amount of electric charge generated by bending or twisting.

As illustrated in FIG. 4A, when the base board 90 bends, the amount of electric charge generated in the piezoelectric film 91 changes, and the amount of electric charge generated in the piezoelectric film 92 hardly changes. The amount of electric charge generated in the piezoelectric film 91 changes depending on dimension and direction of the bending. That is, when the uniaxial drawing direction forms 45 degrees relative to the fixed side, bending and bending amount are detected, and twisting is not detected. In this manner, pressing and pressing amount can be detected without detecting twisting that contributes to another noise. The amount of electric charge linearly changes with the pressing amount.

As illustrated in FIG. 4B, when the base board 90 twists, the amount of electric charge generated in the piezoelectric film 91 hardly changes, and the amount of electric charge generated in the piezoelectric film 92 changes. The amount of electric charge generated in the piezoelectric film 92 changes depending on dimension and direction of the twisting. That is, when the uniaxial drawing direction forms 90 degrees relative to the fixed side, twisting and twisting angle are detected, and deformation is not detected.

Another experiment demonstrates that, as the angle that the uniaxial drawing direction forms relative to the fixed side is shifted from 45 degrees, the amount of electric charge generated according to the shifted amount lowers.

By fixing each side of the pressure sensor 20 to the housing 50 and setting the uniaxial drawing direction 900 to the direction of 45 degrees in plan view, the above-mentioned effect on the displayed image can be achieved, pressing can be detected at a high sensitivity and pressing amount can be detected with high accuracy. Moreover, wrong detection caused by other stresses such as twisting can be suppressed.

By disposing the insulating front polarizing plate 302 on the side of the operation surface of the pressure sensor 20 as described above, the electrode 202 of the pressure sensor 20 can be prevented from being exposed on the side of the operation surface. This eliminates the necessity for providing a protective film for the pressure sensor 20 against external environment.

In this embodiment, the pressure sensor 20 is disposed between the front polarizing plate 302 and the liquid crystal panel 301, but the pressure sensor 20 may be disposed between the liquid crystal panel 301 and the rear reflective plate 303. However, when the pressure sensor 20 is disposed between the front polarizing plate 302 and the liquid crystal panel 301, only the front polarizing plate 302 is present between the operation surface and the pressure sensor 20. For this reason, upon pressing of the operation surface, the piezoelectric film 201 of the pressure sensor 20 can be greatly bent. This can improve the detection sensitivity of the pressing amount.

Using such configuration, the pressure sensor 20 may be used as a trigger input unit for activating operation. This eliminates the necessity for making a hole in the housing and providing an operational switch, thereby achieving the electronic device with pressing input function 1 having excellent waterproofness and design qualities.

Figure 5A:
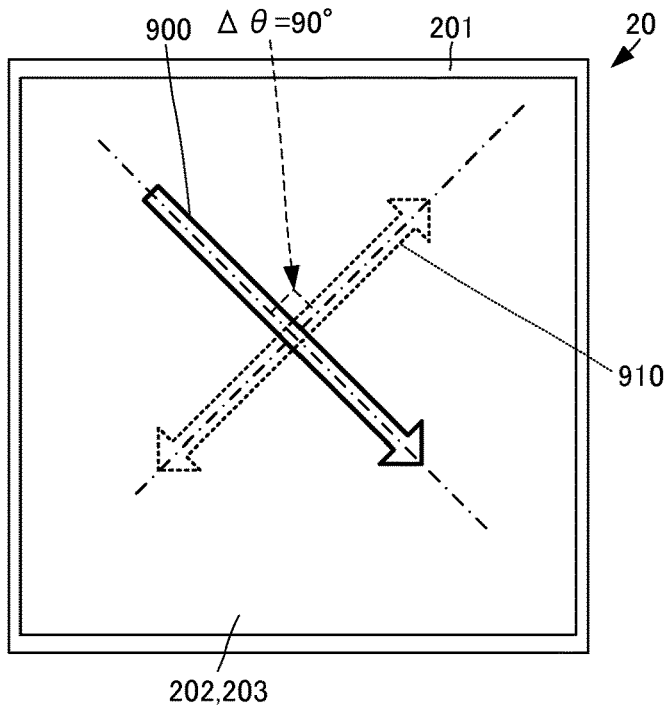
FIGS. 5(A) and 5(B) are plan views of another mode of the pressure sensor in accordance with the first embodiment of the present invention.
Figure 5B:
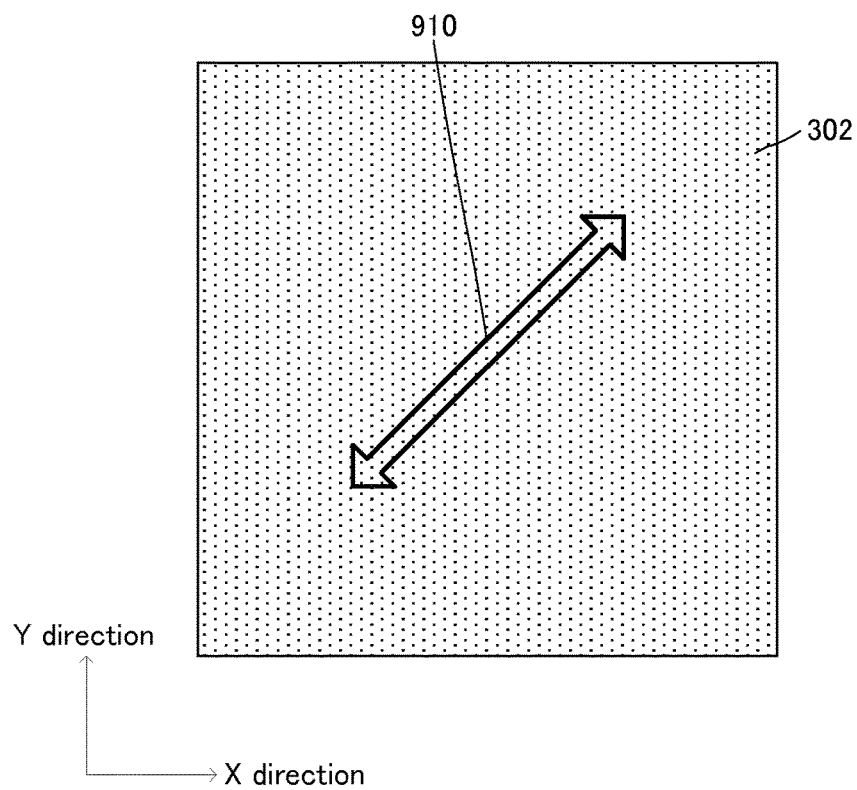

With the above-mentioned configuration, the uniaxial drawing direction 900 of the piezoelectric film 201 is parallel to the polarizing direction 910 of the front polarizing plate 302, but these directions may have relationship as illustrated in FIGS. 5(A) and 5(B). FIGS. 5(A) and 5(B) are plan views of another mode of the pressure sensor in accordance with the first embodiment of the present invention.

In the mode illustrated in FIGS. 5(A) and 5(B), the uniaxial drawing direction 900 is orthogonal to the polarizing direction 910. That is, the angular difference ΔO between the uniaxial drawing direction 900 and the polarizing direction 910 is 90 degrees. According to even such aspect, the effect of retardation on the pressure sensor 20 can be suppressed such that the operator can view desired color to be reproduced on the display panel 30 without discoloration.

The above-mentioned concept that the uniaxial drawing direction 900 is parallel to or orthogonal to the polarizing direction 910 includes the case where the angular difference Δθ is almost 0 degree or almost 90 degrees, and the allowable scope of the angular difference Δθ can be appropriately set according to the specification of the electronic device with pressing input function 1, for example, to about ±5 degrees.

Next, a display panel with pressure sensor in accordance with a second embodiment of the present invention will be described with reference to the figures. The basic structure such as the contour and so on of an electronic device with pressing input function in this embodiment is the same as that of the electronic device with pressing input function 1 in the first embodiment except for the configuration of a display panel with pressure sensor. Accordingly, only the difference between the display panel with pressure sensor in this embodiment and the display panel with pressure sensor in the first embodiment will be specifically described.

Figure 6A:
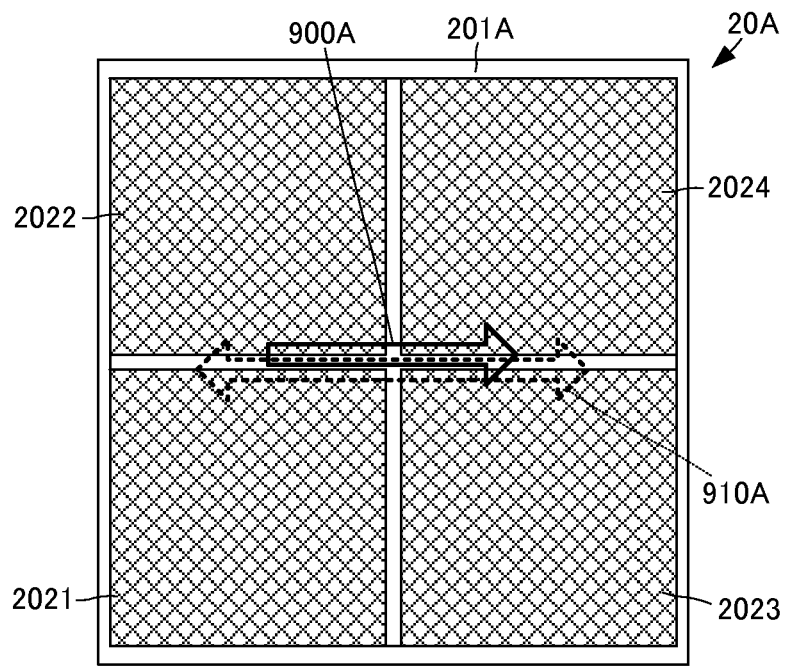
FIGS. 6A and 6B are plan views of a display panel with pressure sensor in accordance with a second embodiment of the present invention.
Figure 6B:
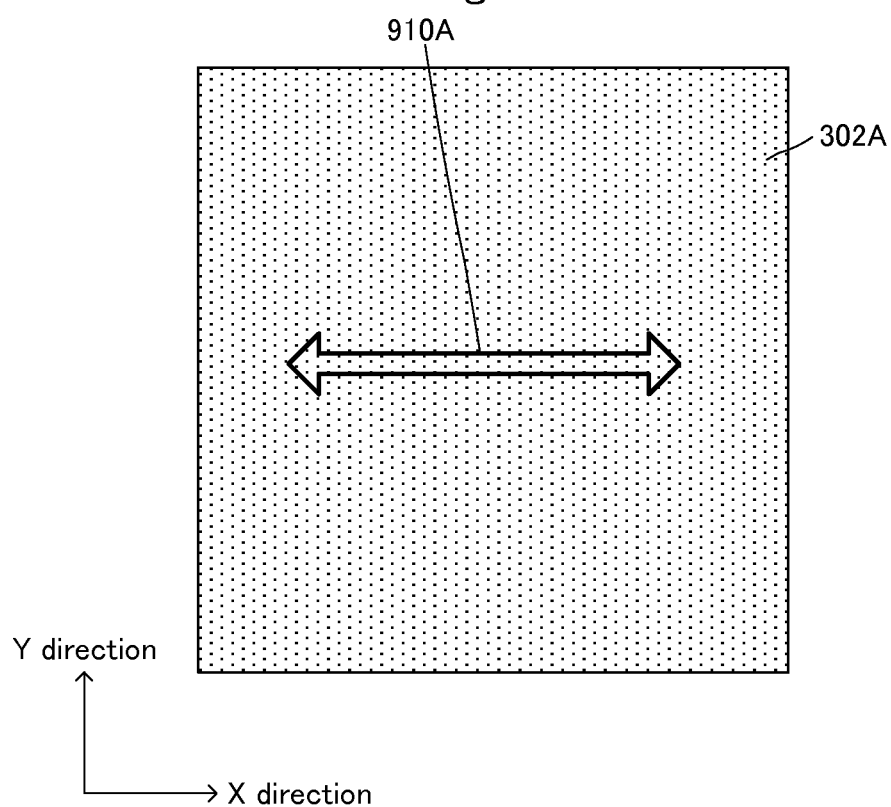

FIGS. 6A and 6B are plan views of the display panel with pressure sensor in accordance with a second embodiment of the present invention. FIG. 6A is a plan view of the pressure sensor, and FIG. 6B is a plan view of a front polarizing plate.

As illustrated in FIG. 6B, in a front polarizing plate 302A of the display panel with pressure sensor in this embodiment, a polarizing direction 910A is parallel to the first direction.

In the piezoelectric film 201 of the pressure sensor 20A, a uniaxial drawing direction 900A is parallel to the first direction. That is, the polarizing direction 910A of the front polarizing plate 302A and the uniaxial drawing direction 900A of the piezoelectric film 201A are parallel to the first direction, and are parallel to each other. With such configuration, even the display panel in which the polarizing direction 910A of the front polarizing plate 302A is parallel to the first direction can present desired color to be produced to the operator without discoloration.

Four electrodes 2021, 2022, 2023, and 2024 are formed on one principal face of the pressure sensor 20A. The electrodes 2021, 2022, 2023, and 2024 are formed by dividing the electrode 202 in the first embodiment along a dividing portion (non-electrode portion) extending in the first direction through the center of the electrode 202 and a dividing portion (non-electrode portion) extending in the second direction. Though not illustrated, the electrode on the other principal face (electrode corresponding to the electrode 203 in the first embodiment) may or may not be divided into the electrodes 2021, 2022, 2023, and 2024.

With such configuration, although the uniaxial drawing direction 900A is parallel to the first direction, when a pressing force is applied to the center of the operation surface, that is, the center of the piezoelectric film 201A, electric charge that would be compensated and thus, could not be detected with the electrode spreading over the face can be detected. Specifically, when the center of the operation surface (the center of the piezoelectric film 201A) is pressed, electric charge generated in the piezoelectric film 201A varies according to regions where the electrodes 2021, 2022, 2023, and 2024 are disposed, and different amounts of electric charge can be detected. Accordingly, the pressing amount can be calculated by adding (adding or subtracting in calculation) the amounts of electric charge detected using the electrodes 2021, 2022, 2023, and 2024 so as not to cause compensation rather than by merely adding the amounts. For example, the arithmetic processing module 60 may perform such calculation.

Even when the polarizing direction of the front polarizing plate of the display panel is not 45 degrees, the configuration in this embodiment enables reliable detection of the pressing amount. By appropriately setting the electrode pattern on the piezoelectric film 201 based on the configuration in the first embodiment and the configuration in the second embodiment, even when the polarizing direction of the front polarizing plate with respect to the housing is any direction, desired color to be reproduced on the display panel can be presented to the operator without discoloration, and the pressing amount can be reliably detected.

Figure 7:
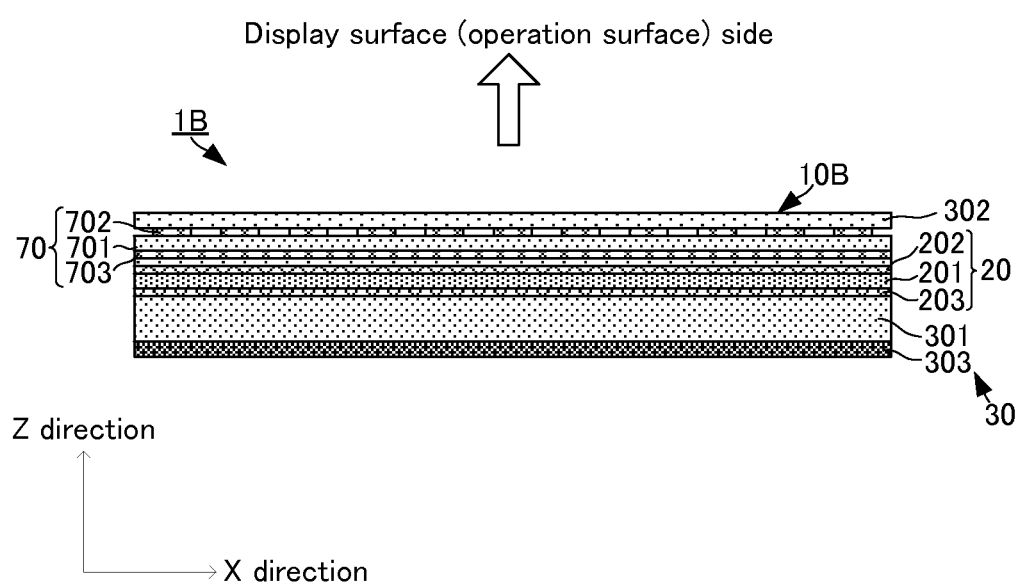
FIG. 7 is a sectional view of an electronic device with pressing input function in accordance with a third embodiment of the present invention.
Figure 8A:
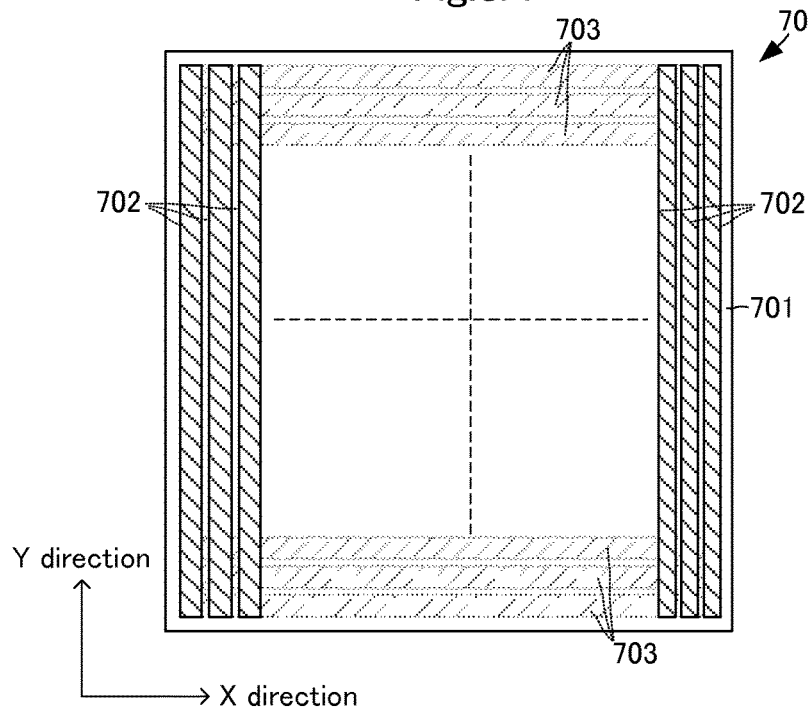
FIGS. 8A and 8B are plan views of a display panel with pressure sensor in accordance with the third embodiment of the present invention.
Figure 8B:
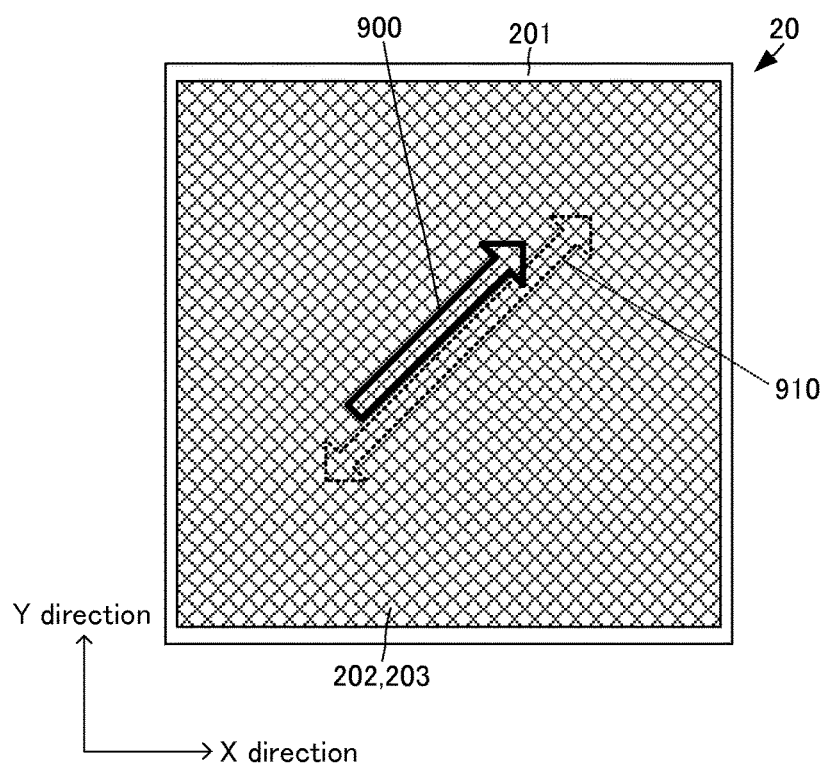

Next, a display panel with pressure sensor in accordance with a third embodiment of the present invention will be described with reference to the figures. The basic structure such as the contour and so on of an electronic device with pressing input function 1B in this embodiment is the same as that of the electronic device with pressing input function 1 in the first embodiment except for the configuration of a display panel with pressure sensor 10B. Accordingly, only the difference between the display panel with pressure sensor 10B and the display panel with pressure sensor 10 in the first embodiment will be specifically described. FIG. 7 is a sectional view of the display panel with pressure sensor in accordance with the third embodiment of the present invention. FIGS. 8A and 8B are plan views of the display panel with pressure sensor in accordance with the third embodiment of the present invention; FIG. 8A is a plan view of a position detecting sensor, and FIG. 8B is a plan view of a pressure sensor.

As illustrated in FIG. 7, the display panel with pressure sensor 10B in this embodiment includes a position detecting sensor 70. The position detecting sensor 70 includes a flat plate-like insulating board 701. The insulating board 701 is made of a translucent material having no birefringence. As illustrated in FIG. 8A, a plurality of electrodes 702 are formed on one flat plate face of the insulating board 701. The plurality of electrodes 702 are long, and its longitudinal direction corresponds to the Y direction. The plurality of electrodes 702 are spaced in the X direction. A plurality of electrodes 703 are formed on the other flat plate face of the insulating board 701. The plurality of electrodes 703 are long, and its longitudinal direction corresponds to the X direction. The plurality of electrodes 703 are spaced in the Y direction. Like the electrodes 202, 203 of the pressure sensor 20, the plurality of electrodes 702, 703 are made of a translucent material.

The position detecting sensor 70 detects a change of capacitance, which is caused when a finger of the operator comes close, with the electrodes 702, 703, and outputs a capacitance detection signal to the arithmetic circuit module 60. The arithmetic circuit module 60 detects the operational position based on the combination of the electrodes 702, 703 that detects the capacitance detection signal.

As illustrated in FIG. 7, the position detecting sensor 70 is disposed between the pressure sensor 20 and the front polarizing plate 302. Even with such configuration, as in the first embodiment, desired color displayed on the display panel can be presented to the operator. Moreover, the configuration in this embodiment enables detection of the pressing amount as well as the operational position.

Figure 9:
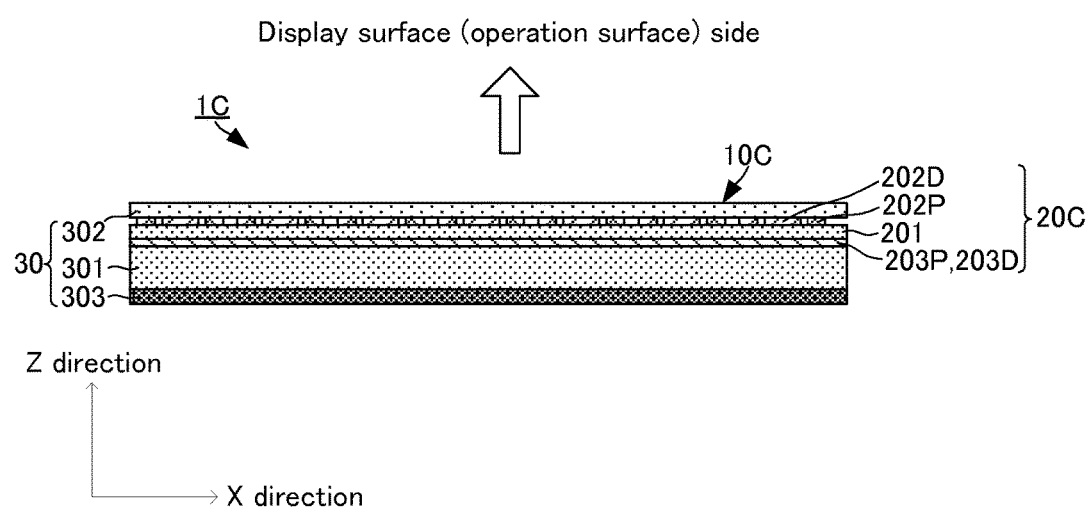
FIG. 9 is a sectional view of a display panel with pressure sensor in accordance with a fourth embodiment of the present invention.

Next, a display panel with pressure sensor in accordance with a fourth embodiment of the present invention will be described with reference to the figures. The basic structure such as the contour and so on of an electronic device with pressing input function 1C in this embodiment is the same as that of the electronic device with pressing input function 1B in the third embodiment except for the configuration of a display panel with pressure sensor 10C. Accordingly, only the difference between the display panel with pressure sensor 10C and the display panel with pressure sensor 10B in the third embodiment will be specifically described. FIG. 9 is a sectional view of the display panel with pressure sensor in accordance with the fourth embodiment of the present invention.

The display panel with pressure sensor 10C in this embodiment includes a pressure sensor 20C. The pressure sensor 20C includes a piezoelectric film 201.

A piezoelectric detecting electrode 202P and a capacitance detecting electrode 202D are formed on a first flat plate face of the piezoelectric film 201. The plurality of piezoelectric detecting electrodes 202P and the plurality of capacitance detecting electrodes 202D are formed so as not to be electrically connected to each other.

A piezoelectric detecting electrode 203P and a capacitance detecting electrode 203D are formed on a second flat plate face of the piezoelectric film 201. The plurality of piezoelectric detecting electrodes 203P and the plurality of capacitance detecting electrodes 203D are formed so as not to be electrically connected to each other.

The piezoelectric detection electrodes 202P, 203P are shaped to be capable of detecting a voltage due to electric charge generated by bending of the piezoelectric film 201. The capacitance detecting electrodes 202D, 203D are shaped to be capable of detecting a capacitance change generated from the operation of the operation surface by the operator.

The piezoelectric detection electrodes 202P, 203P, and the capacitance detecting electrodes 202D, 203D are made of a translucent material.

With such configuration, the pressure sensor 20C using the single piezoelectric film 201 can detect the pressing amount and the operational position.

With such configuration, as in each of the embodiments, a desired color displayed in the display panel can be offered to the operator. Further, the display panel with pressure sensor and the electronic device with pressing input function, which are capable of detecting the pressing amount and the operational position, can be made thinner.

Figure 10:
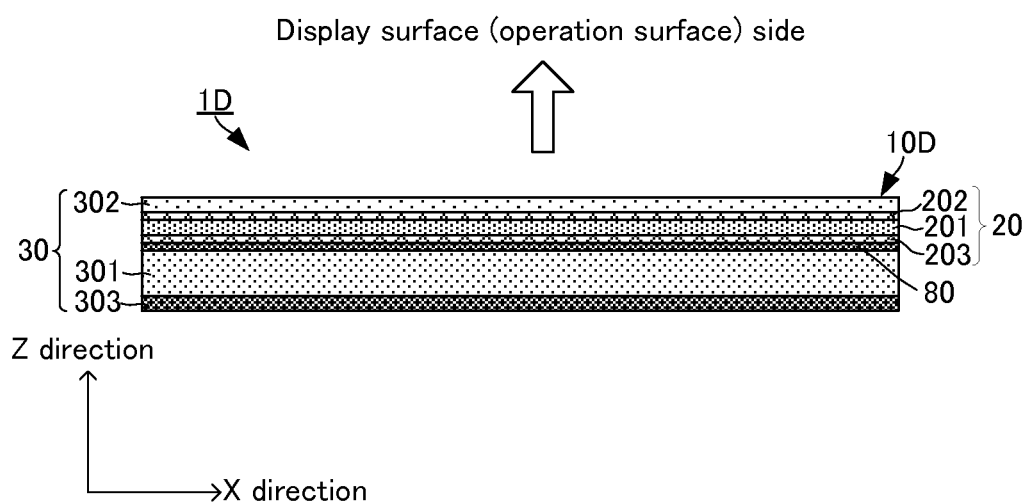
FIG. 10 is a sectional view of a display panel with pressure sensor in accordance with a fifth embodiment of the present invention.

Next, a display panel with pressure sensor in accordance with a fifth embodiment of the present invention will be described with reference to the figures. The basic structure such as the contour and so on of an electronic device with pressing input function 1D in this embodiment is the same as that of the electronic device with pressing input function 1 in the first embodiment except for the configuration of a display panel with pressure sensor 10D. Accordingly, only the difference between the display panel with pressure sensor 10D and the display panel with pressure sensor 10 in the first embodiment will be specifically described. FIG. 10 is a sectional view of the display panel with pressure sensor in accordance with the fifth embodiment of the present invention.

In the display panel with pressure sensor 10D, a buffer member 80 is disposed between the pressure sensor 20 and the liquid crystal panel 301. The buffer member 80 is made of an insulating and translucent material having no birefringence. The buffer member 80 is made of a material having a low elasticity.

With even such configuration, as in the above-mentioned embodiments, desired color displayed on the display panel can be presented to the operator. Moreover, since providing the buffer member 80 increases the operation surface, even when the pressure sensor 20 has a large area, the flat plate face can be kept flat and thus, does not obstruct bending of the pressure sensor 20 due to pressing by operation. Therefore, the pressing amount can be detected at a higher sensitivity.

Figure 11:
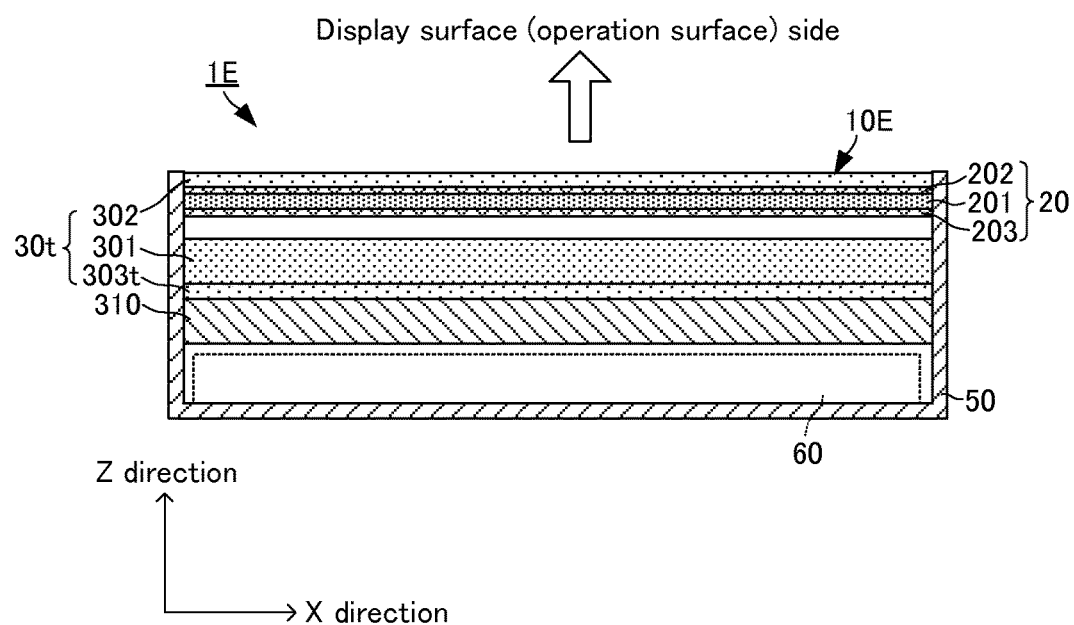
FIG. 11 is a sectional view of a display panel with pressure sensor in accordance with a sixth embodiment of the present invention.

Next, a display panel with pressure sensor in accordance with a sixth embodiment of the present invention will be described with reference to a figure. The basic structure such as the contour and so on of an electronic device with pressing input function 1E in this embodiment is the same as the electronic device with pressing input function 1 in the first embodiment except that a display panel 30t is a transmission display panel. FIG. 11 is a sectional view of the display panel with pressure sensor in accordance with the sixth embodiment of the present invention.

As illustrated in FIG. 11, the display panel 30t includes a liquid crystal panel 301, a front polarizing plate 302, and a rear polarizing plate 303t. A backlight 310 is disposed on the side of the arithmetic circuit module 60 of the display panel 30t. A polarizing direction of the rear side polarizing plate 303t is orthogonal to the polarizing direction of the front side polarizing plate 302.

Even such transmission display panel enables the display panel to present desired color to the operator, as in the above-mentioned embodiments. For TN liquid crystal having a twist angle of 90 degrees, this embodiment can be applied. For STN liquid crystal having a twist angle of 90 degrees or more, for example, the STN liquid crystal having a twist angle of 180 degrees may be used to make the polarizing direction of the rear side polarizing plate parallel to the polarizing direction of the front side polarizing plate.

In the above-mentioned embodiments, PLA or PLLA is used as the piezoelectric film formed of chiral polymer. However, the above-mentioned configuration can be applied to the case of using another piezoelectric film having birefringence, such as PDLA.

One piezoelectric film (pressure sensor) is used in the above-mentioned embodiments, but a plurality of the piezoelectric films (pressure sensors) may be stacked. In this case, the piezoelectric films may be disposed such that the uniaxial drawing direction of each piezoelectric film is parallel to the polarizing direction of the front polarizing plate or the rear polarizing plate. Through the use of the piezoelectric films (pressure sensors), by adding up electric charge (voltage) generated in the films so as not to cause compensation, the entire amount of detected electric charge (voltage) can be increased.

In the above-mentioned embodiments, the pressure sensor is disposed between the front polarizing plate and the liquid crystal panel. However, the pressure sensor may be disposed opposite to the liquid crystal panel across the front polarizing plate, achieving the same effect.

REFERENCE SIGNS LIST 1, 1B, 1C, 1D, 1E electronic device with pressing input function
10, 10B, 10C, 10D, 10E display panel with pressure sensor
20, 20A pressure sensor
30, 30t display panel
50 housing
60 arithmetic circuit module
70 position detecting sensor
80 buffer member
201, 201A piezoelectric film
202, 203, 2021, 2022, 2023, 2024 electrode
202P, 203P piezoelectric detecting electrode
202D, 203D capacitance detecting electrode
301 liquid crystal panel
302, 302A front polarizing plate
303 rear reflective plate
701 insulating board
702, 703 electrode

The invention claimed is:
1. A display panel comprising:
an image forming panel configured to control light emitted to a front face side to form a displayed image;

a front polarizing plate disposed adjacent the front face side of the image forming panel; and a pressure sensor including a single film formed of only a single piezoelectric film that is a chiral polymer, wherein the pressure sensor is disposed relative to the image forming panel such that a uniaxial drawing direction of the single film is parallel to or orthogonal to a polarizing direction of the front polarizing plate.

2. The display panel according to claim 1, wherein the pressure sensor is disposed between the front polarizing plate and the image forming panel.

3. The display panel according to claim 2, wherein only the front polarizing plate is present between an operation surface of the display panel and the pressure sensor.

4. The display panel according to claim 2, further comprising a position detecting sensor between the front polarizing plate and the pressure sensor.

5. An electronic device comprising:
the display panel according to claim 4;
an arithmetic unit configured to detect a pressing amount based on a first detection signal from the pressure sensor and a pressing position based on a second detection signal from the position detecting sensor; and
a housing defining a display surface, the housing being configured to accommodate the display panel and the arithmetic unit.

6. The display panel according to claim 1, wherein only the front polarizing plate is present between an operation surface of the display panel and the pressure sensor.

7. The display panel according to claim 1, wherein the chiral polymer is polylactic acid.

8. The display panel according to claim 7, wherein the polylactic acid is at least uniaxially drawn.

9. The display panel according to claim 1, further comprising a buffer member between the pressure sensor and the image forming panel.

10. The display panel according to claim 1, further comprising a position detecting sensor between the front polarizing plate and the image forming panel.

11. An electronic device comprising:
the display panel according to claim 10;
an arithmetic unit configured to detect a pressing amount based on a first detection signal from the pressure sensor and a pressing position based on a second detection signal from the position detecting sensor; and
a housing defining a display surface, the housing being configured to accommodate the display panel and the arithmetic unit.

12. The display panel according to claim 1, further comprising a position detecting sensor between the front polarizing plate and the pressure sensor.

13. An electronic device comprising:
the display panel according to claim 12;
an arithmetic unit configured to detect a pressing amount based on a first detection signal from the pressure sensor and a pressing position based on a second detection signal from the position detecting sensor; and
a housing defining a display surface, the housing being configured to accommodate the display panel and the arithmetic unit.

14. The display panel according to claim 1, wherein the pressure sensor includes a first set of electrodes configured to detect a pressure applied to the single piezoelectric film, and a second set of electrodes configured to detect a touch position of the single piezoelectric film.

15. An electronic device comprising:
the display panel according to claim 14;
an arithmetic unit configured to detect a pressing amount based on a first detection signal from the first set of electrodes and a pressing position based on a second detection signal from the second set of electrodes; and
a housing defining a display surface, the housing being configured to accommodate the display panel and the arithmetic unit.

16. The display panel according to claim 1, further comprising a rear polarizing plate disposed on a side of the image forming panel opposite to the front polarizing plate.

17. The display panel according to claim 16, further comprising a backlight disposed adjacent the rear polarizing plate.

18. An electronic device comprising:
the display panel according to claim 1;
an arithmetic unit configured to detect a pressing amount based on a detection signal from the pressure sensor; and
a housing defining a display surface, the housing being configured to accommodate the display panel and the arithmetic unit.

* * * * *